United States Patent [19]

Sakamoto et al.

[11] Patent Number: 5,012,326
[45] Date of Patent: Apr. 30, 1991

[54] TELEVISION SIGNAL TRANSMITTING AND RECEIVING SYSTEM

[75] Inventors: Noriya Sakamoto, Yokohama; Kiyoyuki Kawai, Yokosuka; Seijiro Yasuki, Yokohama, all of Japan

[73] Assignee: Kabushiki Kaisha Toshiba, Kawasaki, Japan

[21] Appl. No.: 387,998

[22] Filed: Aug. 1, 1989

[30] Foreign Application Priority Data

Aug. 23, 1988 [JP] Japan .................. 63-207443

[51] Int. Cl.$^5$ .............................. H04N 7/12
[52] U.S. Cl. ...................... 358/11; 358/141; 358/140
[58] Field of Search .............. 358/140, 141, 11, 12, 358/13, 133

[56] References Cited

U.S. PATENT DOCUMENTS 4,701,783 10/1987 Glenn .................... 358/12
4,720,744 1/1988 Washi et al. ............ 358/141

OTHER PUBLICATIONS

ITEJE Technical Report, vol. 12, No. 30, P55-P60, 1988, "A foundmental study of 3 dimensional frequency division multiplexing", K. Kawai, S. Yasuki, N. Sakamoto.

Primary Examiner—Howard W. Britton
Assistant Examiner—David E. Harvey
Attorney, Agent, or Firm—Oblon, Spivak, McClelland, Maier & Neustadt

[57] ABSTRACT

A noninterlaced Y signal is separated into a horizontal high frequency component H and a horizontal low frequency component L by a LPF and an adder circuit at a time of interlace conversion. The component H is converted to an interlaced signal by a field repeating process comprising an interfield averaging process by an interfield averaging circuit, a field thinning out process by a field thinning out circuit and a delay process by an interlace conversion circuit. On the other hand, the component L is converted to an interlaced signal by a line thinning out process by an interlace conversion circuit. At a time of noninterlace conversion, the interlaced Y signal is separated into the components H and L by an LPF and an adder circuit. The component H is converted to a noninterlaced signal by means of an interfield interpolation process comprised of an interfield addition process by an interfield adder circuit and a field repeating process by a field repeating circuit, while the component L is converted to a noninterlaced signal by a motion-adaptive interpolation process of a noninterlace conversion circuit.

11 Claims, 8 Drawing Sheets

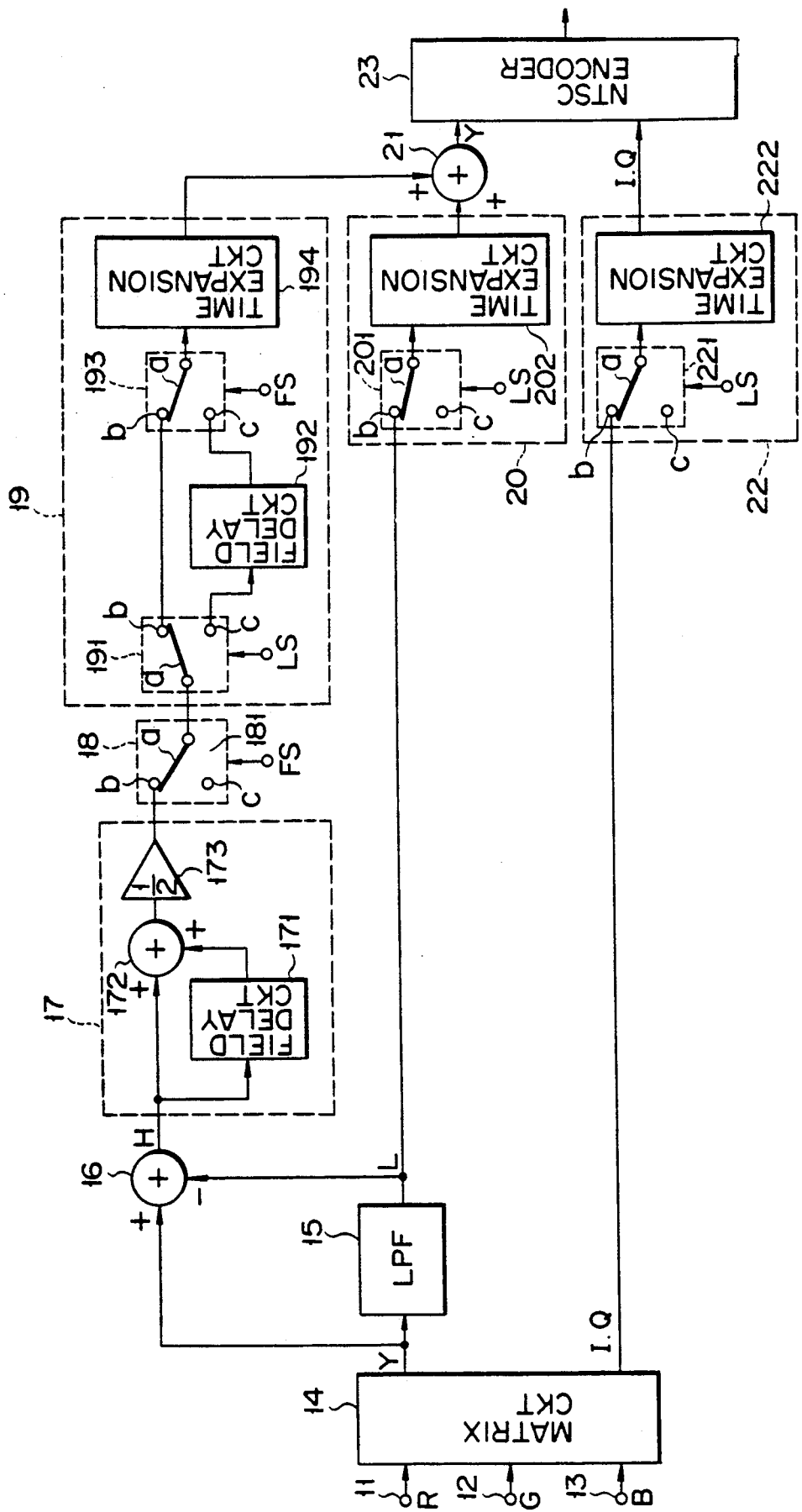
F I G. 5

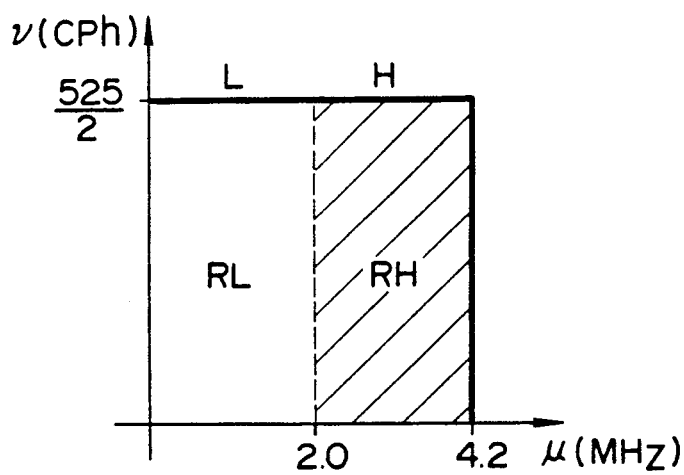
F I G. 7A
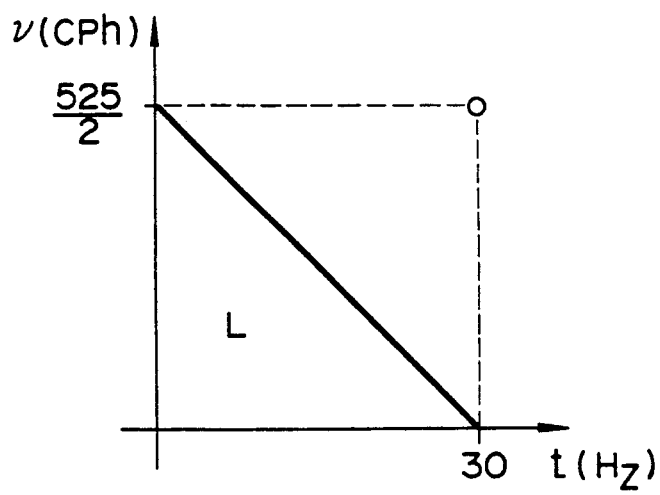
F I G. 7B
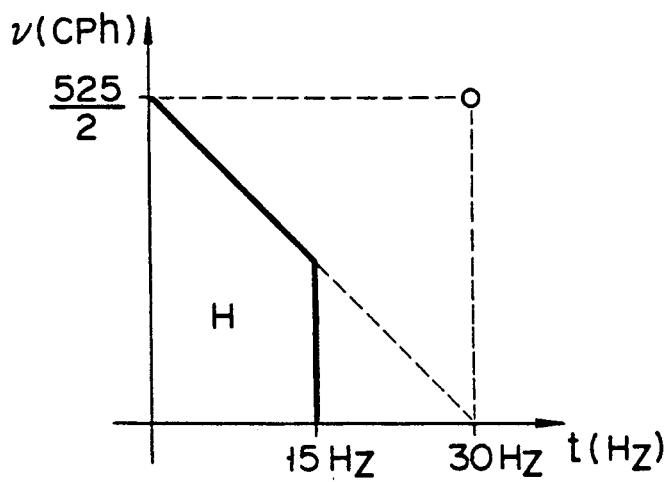
F I G. 7C

TELEVISION SIGNAL TRANSMITTING AND RECEIVING SYSTEM

BACKGROUND OF THE INVENTION

1. Field of the Invention

The present invention relates to a television signal transmitting and receiving system in which a television signal of a non-interlaced format is converted to television signal of an interlaced format for transmission on a transmitter side and the received signal is converted to the television signal of the non-interlaced format for picture reproduction on a receiver side.

2. Description of the Related Art

With recent significant advances in digital processing techniques for television signals, various picture quality improving methods have been proposed in the existing television broadcasting systems.

One of the methods is a picture reproducing method using non-interlaced signals which are produced by a non-interlacing type of television camera.

As described in a paper entitled "Spatial resolution of sequential scanning camera," Reports of National Convention of Television Society of Japan, pp. 41–42, 1987 (document 1), the non-interlacing television camera can significantly improve the overall resolution over existing interlacing television cameras. According to the picture reproduction method, therefore, the picture quality can be improved significantly.

As can be seen, to be compatible with the existing system, the picture reproducing method based on the non-interlaced signals requires a noninterlace-to-interlace conversion (hereinafter referred to as interlace conversion) process on the transmitter side and an interlace-to-noninterlace conversion (hereinafter referred to as noninterlace conversion) process on the receiver side.

For the interlace conversion on the transmitter side, a method in which lines are thinned out is generally used. As the noninterlace converting method on the receiver side, on the other hand, there is a converting method based on a motion-adaptive interpolation process described, for example, in "A-Motion-Adaptive High Definition Converter for NTSC Color TV Signal," SMPTE Journal, May 1984 (document 2). The converting method based on the motion adaptive interpolation process detects the motion of pictures in order to convert moving pictures in accordance with an intrafield interpolation process and convert still pictures in accordance with an interfield interpolation process.

With the converting method based on the motion adaptive interpolation process, however, since the motion of pictures is detected by detecting an interframe difference, there is a problem that reproduced horizontal edges of pictures which are abruptly switched between motion and still will flutter.

That is, with sampling clocks used for digitizing television signals, relative jitters usually occur between transmission and reception sides. Such jitters will result in false interframe difference signals at the horizontal edge portions. As a result, in detecting the movement of pictures, portions that are not moving pictures may be judged as being moving pictures. Thus, the noninterlace conversion based on the intrafield interpolation will be effected, thereby causing the reproduced edges to flutter.

Furthermore, another problem with the noninterlace conversion method is that the vertical resolution is degraded in moving areas. This is because the noninterlace conversion for moving pictures is achieved by the intrafield interpolation. If such degradation of the vertical resolution occurred with moving pictures in which an object kept still starts moving abruptly, the pictures would be blurred abruptly.

The two types of picture degradation described above become the more liable to be noticeable for an improvement in picture quality due to noninterlaced signals and thus must be solved as quickly as possible.

SUMMARY OF THE INVENTION

It is accordingly an object of the present invention to provide a television signal transmitting and receiving system which can resolve the horizontal reproduced edge fluttering problem and the problem of reduced vertical resolution in moving pictures.

To attain the object, the present invention carries out the interlace conversion of that horizontal high frequency component of a luminance signal which contains horizontal edge portions by at least a field thinning process and a field delaying process and thus always enables the noninterlace conversion thereof to be performed by means of an interfield interpolation process.

According to the above arrangement, a malfunction which may occur in the detection of movements because of an false interframe difference signal will not affect the noninterlace conversion of the high frequency component. Therefore, reproduced horizontal edges can be prevented from fluttering.

Furthermore, the horizontal high frequency signal component can be converted to a noninterlaced signal by means of the interfield interpolation process in the case of moving pictures as well, thus preventing the degradation of vertical resolution of the moving pictures.

BRIEF DESCRIPTION OF THE DRAWINGS

FIG. 5 illustrates a specific arrangement of the transmitting device of FIG. 1;

FIGS. 7A to 7C are two-dimensional spectrum diagrams for explaining the effects of the transmitting and receiving devices of FIGS. 1 and 2.

DETAILED DESCRIPTION OF THE PREFERRED EMBODIMENTS

An embodiment of the present invention will now be described in detail with reference to the drawings.

Figure 1:
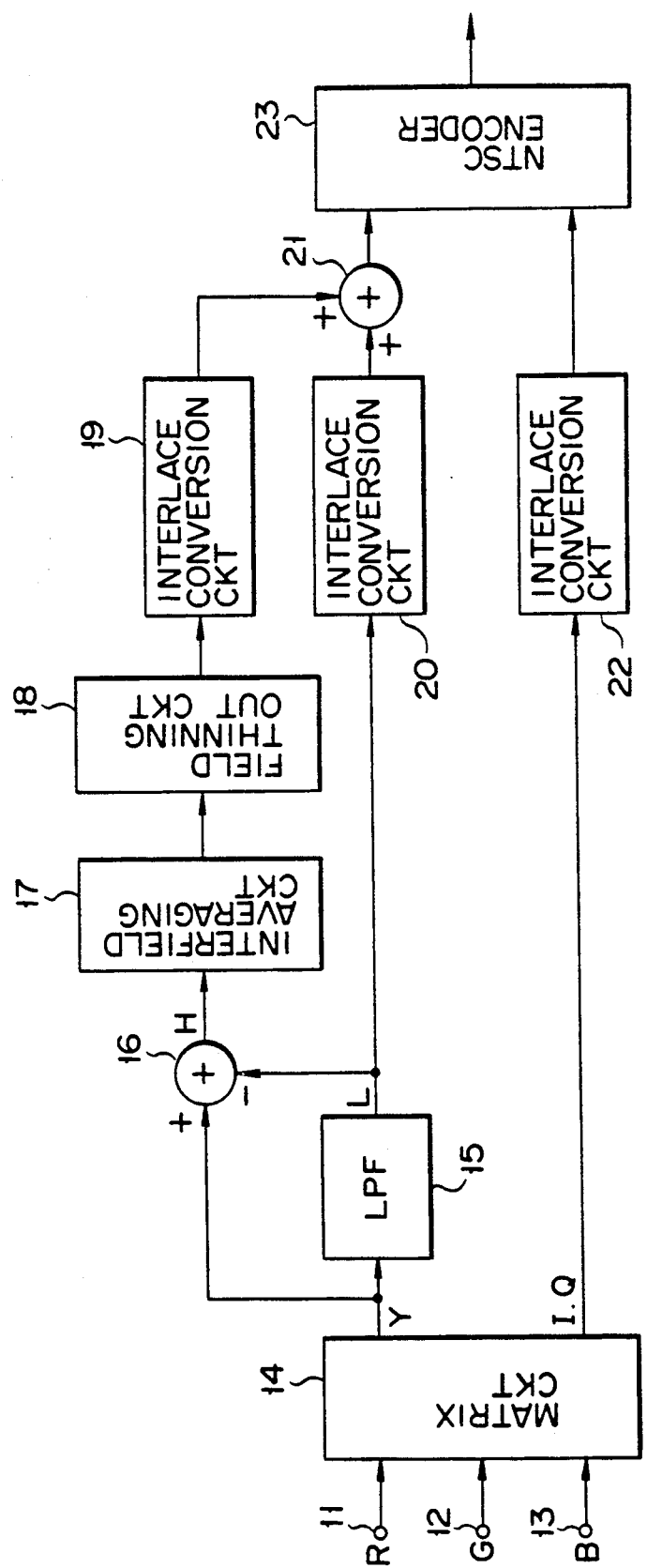
FIG. 1 is a block diagram of a television signal transmitting device embodying the present invention.
Figure 2:
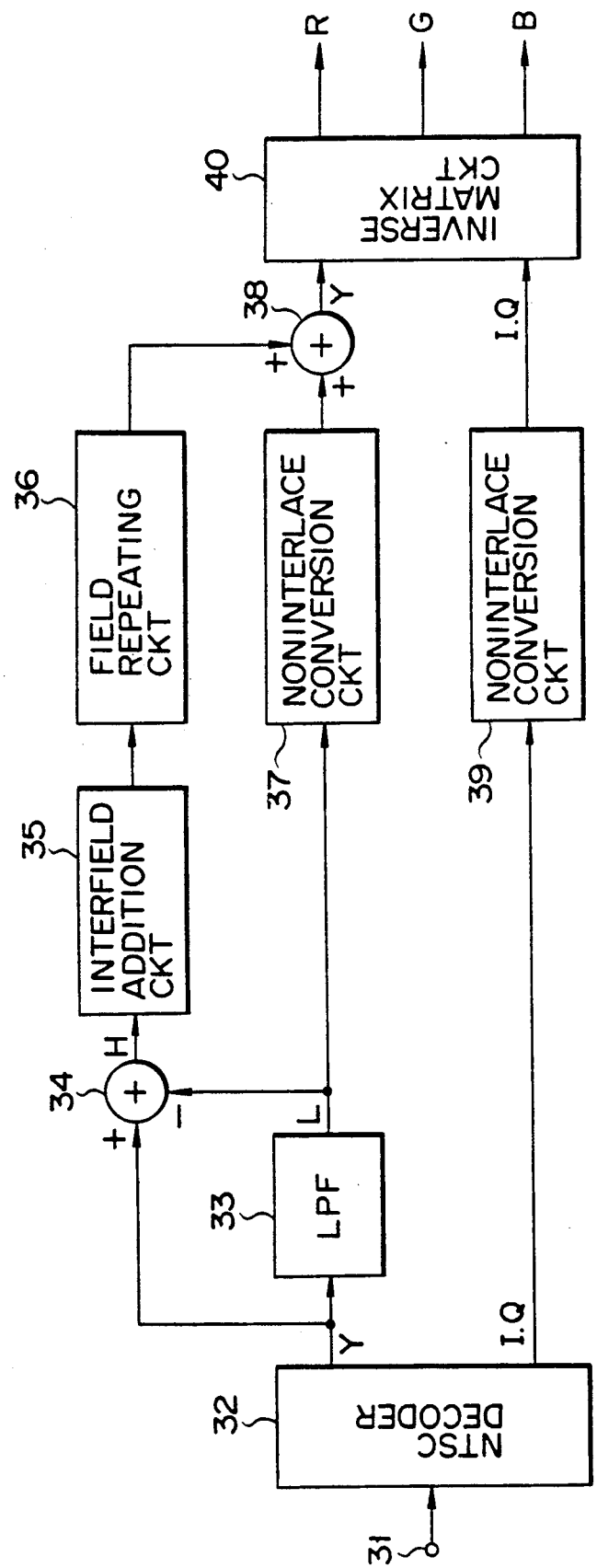
FIG. 2 is a block diagram of a television signal receiving device embodying the present invention.

FIG. 1 illustrates an arrangement of a television signal transmitting device of the present invention. Similarly, FIG. 2 illustrates an arrangement of a television signal receiving device of the present invention.

The arrangement of the transmitting device of FIG. 1 will be described first with reference to FIGS. 3A to 3F in which the horizontal axis represents temporal direction (t) and the vertical axis represents vertical direction (v). Also, the vertical lines represent fields F, the circles horizontal scanning lines HL and the figures over the vertical lines field numbers.

Figure 3:
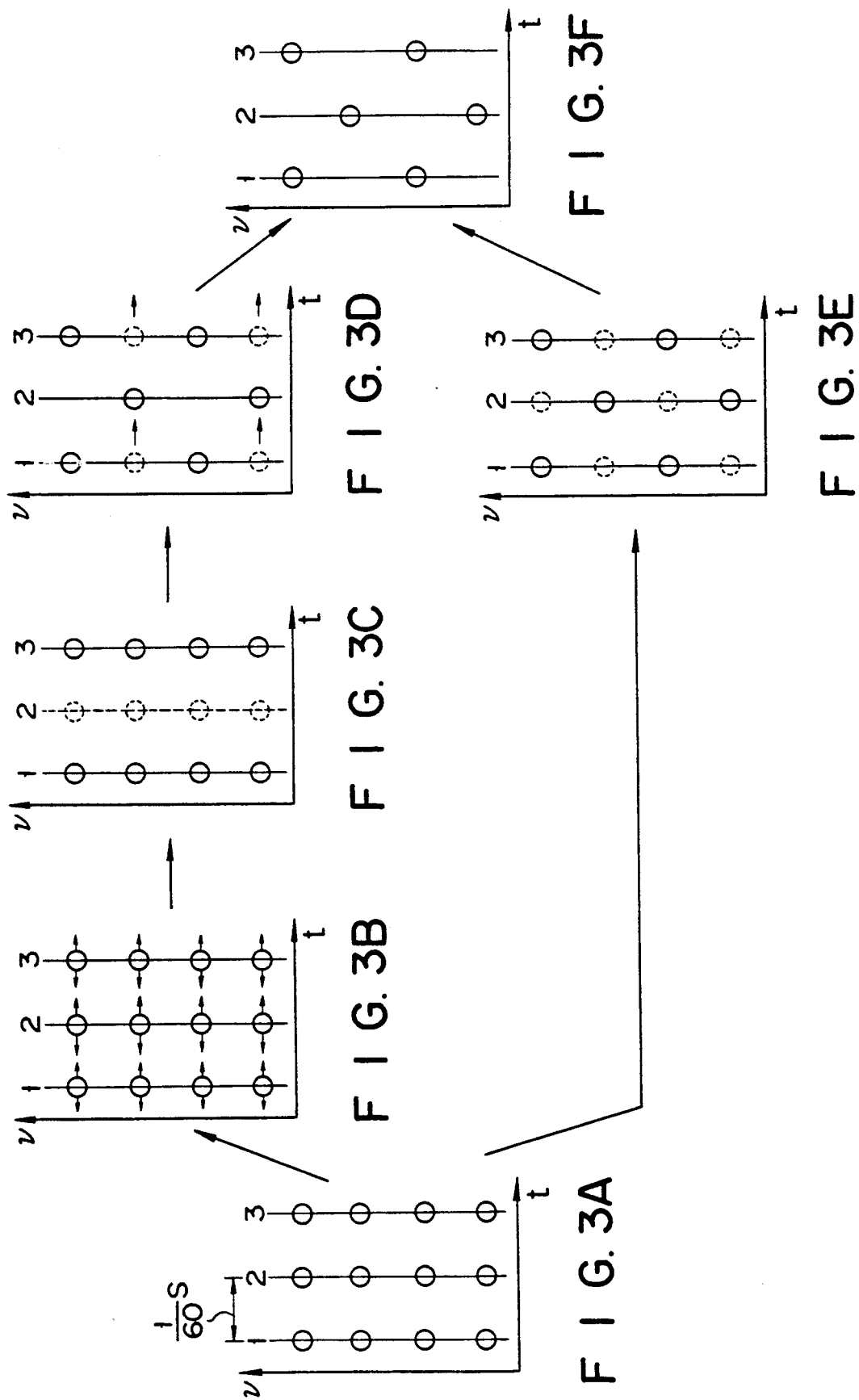
FIG. 3A to 3F are signal waveform diagrams for explaining signal processing at various portions shown in FIG. 1.

In FIG. 1, reference numerals 11, 12 and 13 represent input terminals which receive R, B and G signals of non-interlaced format from a non-interlaced scanning color television camera not shown. The R, G and B signals applied to input terminals 11, 12 and 13 are converted to a luminance signal (referred to as a Y signal hereinafter) and two color difference signals (referred to as I and Q signals hereinafter) by a matrix circuit 14. The Y, I and Q signals are non-interlaced signals with 525 horizontal scanning lines HL per field (1/60 second) as shown in FIG. 3A.

The Y signal output from matrix circuit 14 is separated, for example, into a signal component H (referred to as a horizontal high frequency component hereinafter) of 2 MHz and over and a signal component L (referred to as a horizontal low frequency component) of less than 2.0 MHz in horizontal bandwidth by a lowpass filter (LPF) 15 having a cutoff frequency of 2 MHz and an adder circuit 16.

The horizontal high frequency component H output from adder circuit 16 is interfield-averaged by a interfield averaging circuit 17. For example, this interfield averaging process is carried out by obtaining an average value of signals in two successive fields as shown in FIG. 3B. More specifically, in the second field, signals of the first and second fields are averaged and, in the third field, signals of the second and third fields are averaged.

An interfield average signal output from averaging circuit 17 is applied to a field thinning out circuit 18 where alternate fields are thinned out. This process is illustrated in FIG. 3C, in which case the second field indicated by dotted line is thinned out. By this field thinning out process, a non-interlaced signal is obtained which has 525 horizontal scanning lines HL in 1/30 sec.

An output signal of field thinning-out circuit 18 is converted to an interlaced signal by an interlace conversion circuit 19. The interlace conversion may be effected as follows.

As shown in FIG. 3D, input signals on alternate horizontal scanning lines are first subjected to a time delay equal to one field time interval. In FIG. 3D, dotted circles represent horizontal scanning lines HL to be delayed. As a result, the noninterlaced signals of one field are distributed to two fields. Next, the distributed outputs are subjected to time expansion process for changing the horizontal scanning line period from 32μ sec to 64μ sec, thus resulting in an interlaced signal having 525 horizontal scanning lines in 1/30 sec.

As described above, the interlace conversion for the horizontal high frequency component H is achieved by the interfield averaging process, the field thinning-out process and the field delaying process.

The horizontal low frequency component L output from LPF 15 is converted to an interlaced signal by an interlace conversion circuit 20. In this interlace conversion process, as shown in FIG. 3E, signals on alternate horizontal scanning lines, not alternate fields as in FIG. 3C, are thinned out first. In FIG. 3E, dotted circles represent horizontal scanning lines which have been thinned out. Next, the remaining output is subjected to time expansion process for changing the horizontal scanning line period from 32μ sec to 64μ sec, resulting in an interlaced signal which has 525 horizontal scanning lines in 1/30 sec. As can be seen, the interlace conversion of the horizontal low frequency component L is carried out by line thinning out process.

The interlaced horizontal high frequency and low frequency components H and L are added together by an adder circuit 21, thereby producing a Y signal of such an interlaced format as shown in FIG. 3F.

The I and Q signals output from matrix circuit 14 are also converted to interlaced signals by an interlace conversion circuit 22 adapted to the line thinning out process like the horizontal low frequency component L.

The interlaced signals Y, I and Q signals are converted to an NTSC signal by an NTSC encoder 23 and then transmitted to a receiving side.

Following the above description of the television signal transmitting device of FIG. 1, an arrangement of the television signal receiving device will be described with reference to FIGS. 4A to 4E.

FIGS. 4A to 4F are signal waveform diagrams illustrating signal processes at various portions in the receiving device of FIG. 2. In FIGS. 4A to 4F, the horizontal axis represents temporal direction (t) and the vertical axis represents vertical direction (v). Again, the vertical lines represent fields F, the circles horizontal scanning lines HL and the figures over the vertical lines field numbers.

In FIG. 2, reference numeral 31 denotes an input terminal to which a received signal is applied. The received signal applied to input terminal 31 is converted to Y, I and Q signals by an NTSC decoder 32.

Figure 4:
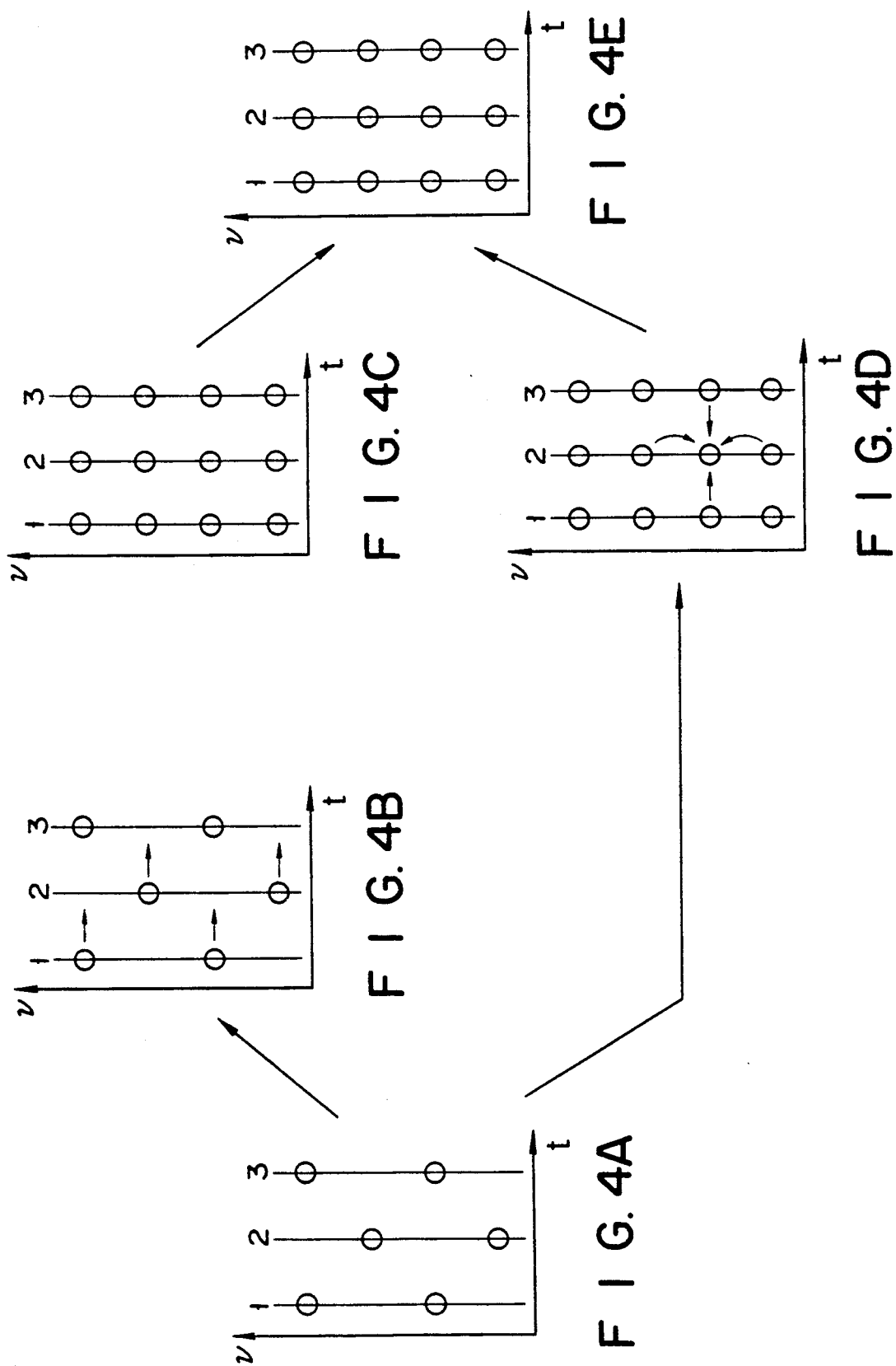
FIGS. 4A to 4E are signal waveform diagrams for explaining signal processing at various portions shown in FIG. 2.

The Y signal output from NTSC decoder 32 is illustrated in FIG. 4B. The Y signal is the same as the Y signal shown in FIG. 3F. The Y signal is separated into a horizontal high frequency component H and a horizontal low frequency component L by an LPF 33 having a horizontal cutoff frequency of 2 MHz and an adder circuit 34.

The horizontal high frequency component H output from adder circuit 34 is applied to an interfield addition circuit 35. In interfield addition circuit 35, a time compression process is carried out first to change the horizontal scanning line period of the input signal from 64μ sec to 32μ sec. Next, the interfield addition process is performed for the time compressed output signals. The adding process is carried out for each of fields F in such a way as to add together signals of two successive fields as shown in FIG. 4B.

An output signal of interfield addition circuit 35 is applied to a field repeating circuit 36, which thins out alternate fields in an input signal and outputs the remaining signal in the field sequence. As a result, a noninterlaced signal is obtained which has 525 horizontal scanning lines in 1/60 sec as shown in FIG. 4C.

As described above, the noninterlace conversion for the horizontal high frequency component H is achieved by interfield interpolation process comprising the interfield addition process and the field repeating process.

The horizontal low frequency component L output from LPF 33 is converted to a noninterlaced signal by a motion-adaptive noninterlace conversion circuit 37. That is, noninterlace conversion circuit 37 detects the motion of pictures so as to convert the input signal to the noninterlaced signal in accordance with interfield interpolation process for still pictures and intrafield interpolation process for moving pictures. In this case, an interpolation signal is obtained as a mixture of an interfield interpolation signal and an intrafield interpolation signal. The mixing ratio of the interfield and intrafield interpolation signals is controlled according to the degree of the motion of pictures. This is to avoid the generation of unnatural pictures due to abrupt switching between the different types of interpolation processes. The interpolation processes are illustrated in FIG. 4D in which arrows drawn temporal direction (t) represent the interfield interpolation process and arrows drawn vertical direction (v) represent the intrafield interpolation process.

The non-interlaced horizontal low frequency component L from noninterlace conversion circuit 37 is added to the noninterlaced horizontal high frequency component H in adder circuit 38, thus producing a noninterlaced signal Y having 525 horizontal scanning lines HL in 1/60 sec as shown in FIG. 4E.

The I and Q signals output from NTSC decoder 32 are each converted to noninterlaced signals by motion-adaptive noninterlace conversion circuits 39 as in the case of the horizontal low frequency component L.

The Y signal output from adder circuit 38 and the I and Q signals output from noninterlace conversion circuit 39 are converted to R, G and B signals by an inverse matrix circuit 40.

Following the above descriptions of the transmitting and receiving devices shown in FIGS. 1 and 2, their specific arrangements will now be described.

FIG. 5 is a circuit diagram illustrating one example of a specific arrangement of the transmitting device shown in FIG. 1.

In FIG. 5, like reference numerals are used to designate like or corresponding parts in FIG. 1.

As shown, interfield averaging circuit 17 is comprised of a field delay circuit 171, an adder circuit 172 and a coefficient multiplying circuit 173.

In this arrangement, the horizontal high frequency component H is subjected to interfield addition by field delay circuit 171 and adder circuit 172, and an output signal of adder circuit 173 is multiplied by a coefficient of ½ in coefficient multiplying circuit 173, thereby producing an interfield average signal.

Field thinning out circuit 18 comprises a switch circuit 181. The moving contact a of switch circuit 181 is alternately connected to fixed contacts b and c every filed by a field switching signal FS having an interval of 1/30 sec.

With such an arrangement, in a field F during which moving contact a is connected to fixed contact b, an output signal of interfield averaging circuit 17 is supplied to interlace conversion circuit 19. In a field during which moving contact a is connected to fixed contact c, on the other hand, the supply of the output signal of interfield averaging circuit 17 to interlace conversion circuit 19 is interrupted. As a result, alternate fields of the output signal of interfield averaging circuit 17 are discarded.

Interlace conversion circuit 19 comprises switch circuits 191 and 193, a field delay circuit 192 introducing a time delay of 1/60 sec and a time expansion circuit 194.

The moving contact a of switch circuit 191 is alternately connected to fixed contacts b and c every horizontal line period by a line switching signal LS having an interval of 64μ sec. The moving contact a of switch circuit 193 is alternately connected to fixed contacts b and c every field by field switching signal FS. Time expansion circuit 194 has a function of expanding the horizontal scanning line period by a factor of two.

With such an arrangement, the output of field thinning out circuit 18 is applied to a fixed contact b of switch circuit 193 during a horizontal scanning line period in which the moving contact a of switch circuit 191 is connected to its fixed contact b and to field delay circuit 192 during a horizontal line period in which the moving contact a is connected to the other fixed contact c. The field-thinned out output applied to field delay circuit 192 is applied to the fixed contact c of switch circuit 193 after a delay of one field time interval. As a result, the output of field thinning out circuit 18 is distributed two fields F every horizontal line period and then has the horizontal scanning line period expanded from 32μ sec to 64μ sec by time expansion circuit 194. Accordingly, an interlaced signal results which has 525 horizontal scanning lines in 1/30 sec.

Interlace conversion circuit 20 comprises a switch circuit 201 having its connection state controlled by line switching signal LS and a time expansion circuit 202 for expanding the horizontal scanning line period by a factor of two.

With such an arrangement, the horizontal low frequency component L output from LPF 15 is applied to time expansion circuit 202 during a horizontal scanning line period in which the moving contact a of switch circuit 201 is connected to a fixed contact b, and the supply of component L to time expansion circuit 202 is interrupted during a horizontal scanning line period in which moving contact a is connected to a fixed contact c, whereby thinning out of lines is effected. The horizontal scanning line period of an output obtained by thinning out is expanded to 64μ sec by time expansion circuit 202, thus resulting in an interlaced signal having 525 horizontal scanning lines in 1/30 sec.

Like interlace conversion circuit 20, interlace conversion circuit 22 also has a switch circuit 221 and a time expansion circuit 222 so that the I and Q signals are subjected to the interlace conversion by means of the process of thinning out lines.

Figure 6:
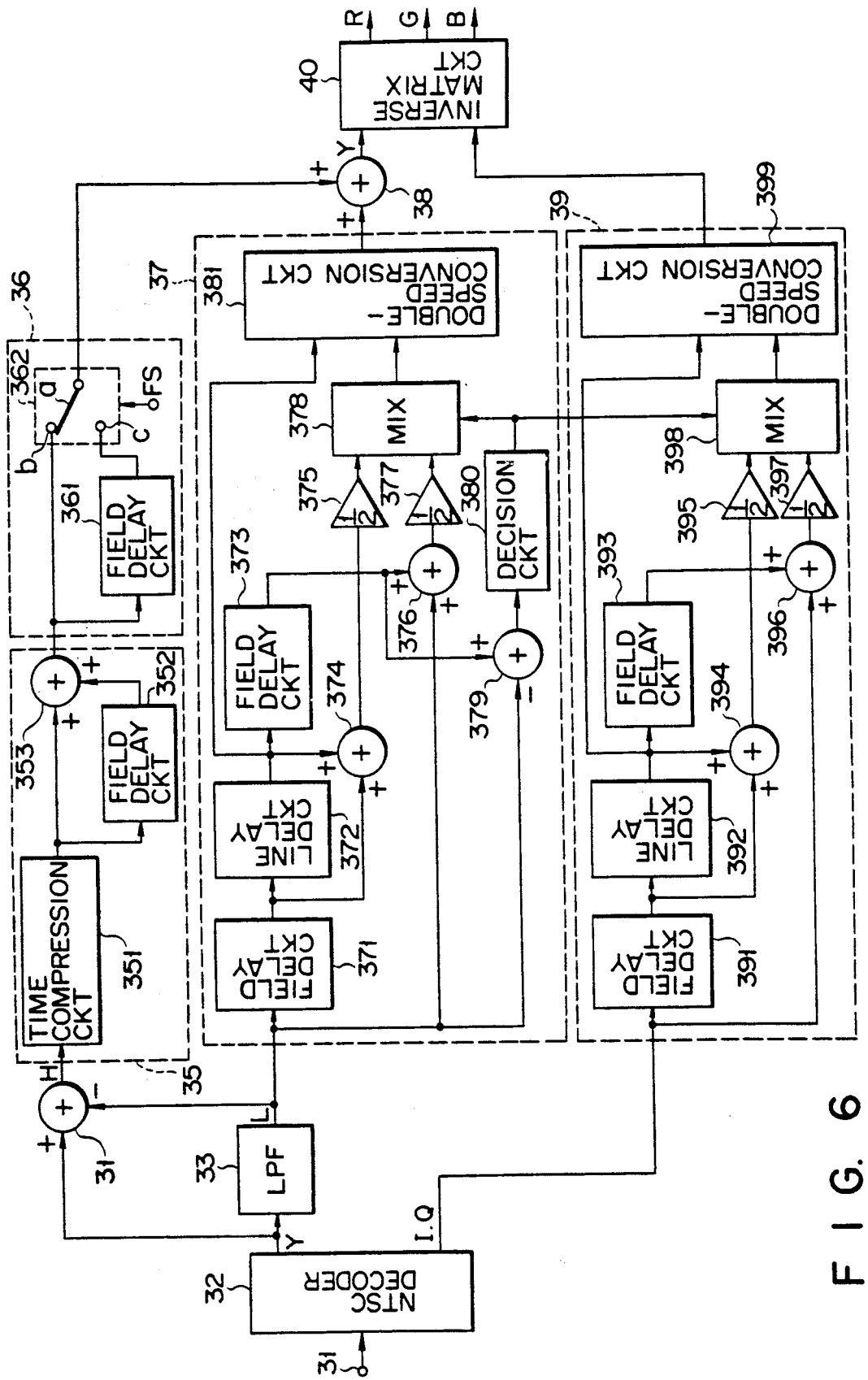
FIG. 6 illustrates a specific arrangement of the receiving device of FIG. 2.

FIG. 6 is a circuit diagram illustrating one example of a specific arrangement of the receiver shown in FIG. 2.

As shown in FIG. 6, interfield addition circuit 35 comprises a time compression circuit 351, a field delay circuit 352 and an adder circuit 353. Time compression circuit 35 has a function of compressing the horizontal scanning line period by a factor of two.

In such an arrangement, the horizontal high frequency component H output from adder circuit 34 has its horizontal scanning line period restored from 64μ to 32μ sec by time compression circuit 353 first. Next, the time compressed output is subjected to interfield addition by field delay circuit 352 and adder circuit 353, whereby horizontal high frequency component H is obtained, which has 525 horizontal scanning lines in 1/60 sec.

Field repeating circuit 36 comprises a field delay circuit 361 and a switch circuit 362 whose moving contact a is connected alternately to fixed contacts b and c every field in response to field switching signal FS.

In such an arrangement, an output signal of interfield addition circuit 35 is selected by switch circuit 362 during a field F in which its moving contact a is connected to its fixed contact b, while a delayed output signal of field delay circuit 361 is selected by switch circuit 362 during the next field in which moving contact a is connected to fixed contact c. As a result, output signals of interfield addition circuit 35 which appear in alternate fields are taken out in field sequence.

Noninterlace conversion circuit 37 comprises an interfield interpolation signal producing circuit for producing an interfield interpolation signal, an intrafield interpolation signal producing circuit for producing an intrafield interpolation signal, a mixing circuit 378 for producing a final interpolation signal in accordance with the two interpolation signals, a detecting circuit for detecting the motion of pictures and a double-speed conversion circuit 381 for double-speed converting the interpolation signal and the current signal.

More specifically, the interfield interpolation signal producing circuit comprises field delay circuits 371 and 373, a line delay circuit 372 for providing a time delay of one horizontal scanning line period, an adder circuit 376 and a coefficient multiplier 377. The intrafield interpolation signal producing circuit comprises a line delay circuit 372, an adder circuit 374 and a coefficient multiplier 375. The motion detecting circuit comprises an adder circuit 379 and a decision circuit 380.

With such an arrangement, the interfield interpolation signal is output from coefficient multiplier 377 as an interframe average signal. The intrafield interpolation signal is output from coefficient multiplier 375 as an interframe average signal. The two interpolation signals are mixed by mixing circuit 378. The mixing ratio in this case is controlled by the motion detecting circuit. In the motion detecting circuit, adder circuit 379 provides an interframe difference signal of the horizontal low frequency component L, and decision circuit 380 detects the degree of the motion of pictures in accordance with the amplitude level of the interframe difference signal. The decision output is applied to mixing circuit 378 as a motion detect signal to thereby control the mixing ratio of the interpolation signals.

The mixed output of mixing circuit 378 is applied to double-speed conversion circuit 381 as the final interpolation signal. To double-speed conversion circuit 381 is applied an output signal of line delay circuit 372 as the current signal which is subjected to the double-speed conversion along with the interpolation signal. Consequently a noninterlaced signal is obtained which has 525 horizontal scanning lines in 1/60 sec.

Noninterlace conversion circuits 39 for the I and Q signals have the same arrangement as noninterlace conversion circuit 37 for the Y signal.

More specifically, noninterlace conversion circuit 39 has an interfield interpolation signal producing circuit comprising field delay circuits 391 and 393; a line delay circuit 392; an adder circuit 396; and a coefficient multiplier 397, an intrafield interpolation signal producing circuit comprising a line delay circuit 392; an adder circuit 394; and a coefficient multiplier 395, a mixing circuit 398 and a double-speed conversion circuit 399. It is to be noted that the motion detecting circuit in noninterlace conversion circuit 37 is used as the motion detecting circuits for the I and Q signals.

According to the embodiment described previously, the following advantages will result.

First, the horizontal reproduced edges can be prevented from fluttering. This is because, by carrying out the interlace conversion of the horizontal high frequency component H, which has horizontal edge portions, in the Y signal by means of the interfield averaging process and the field delaying process, not the line thinning out process, the noninterlace conversion thereof can always be carried out by the interfield interpolation process, not the motion-adaptive interpolation process. In other words, the malfunction of the motion detecting circuit which might result from a false interframe difference signal will not affect the noninterlace conversion of the signal component H. Although the noninterlace conversion of the horizontal low frequency component L is carried out by the motion-adaptive interpolation process, no problem will arise because the component L contains no horizontal edge portion.

In addition, according to the embodiment, the reduction of the vertical resolution of moving pictures can be prevented. This is because the horizontal high frequency component H can be converted to a noninterlaced signal by the interfield interpolation process in the case of moving pictures as well.

Furthermore, according to the embodiment, in spite of the fact that the horizontal high frequency component H is converted to the interlaced signal by means of the interlacing averaging process, the field thinning out process and the field delaying process, the occurrence of visually unnatural motion can be prevented. This is because the boundary frequency f between the horizontal high frequency component H and the horizontal low frequency component L is set to 2 MHz. The reason therefor will be described below in detail with reference to FIGS. 7A to 7C and FIG. 8.

FIG. 7A shows the frequency spectrum of the Y signal of noninterlaced format output from matrix circuit 14 of FIG. 1. The horizontal axis represents frequency of the horizontal direction ($\mu$) and the vertical axis represents frequency of the vertical direction (v). FIG. 7B shows the frequency spectrum of the interlaced horizontal low frequency component L output from interlace conversion circuit 20, while FIG. 7C shows the frequency spectrum of the interlaced horizontal high frequency component H output from interlace conversion circuit 19. Again, the horizontal axis represents frequency of the temporal direction (t) and the vertical axis represents frequency of the vertical direction (v).

As to the horizontal low frequency component L within area RL of FIG. 7A, all the moving components of up to 30 Hz are transmitted as shown in FIG. 7B. As to the horizontal high frequency component H within area RH of FIG. 7A, on the other hand, only the moving components of up to 15 Hz corresponding to the half of the horizontal low frequency component L are transmitted as shown in FIG. 7C. This is because the horizontal high frequency component H is subjected to the field thinning out process in field thinning out circuit 18 of FIG. 1. Band-limiting of the horizontal high frequency component H in temporal direction (t) might cause visually awkward movements of reproduced pictures. However, experiments confirmed that no awkward movements occurred.

Figure 8:
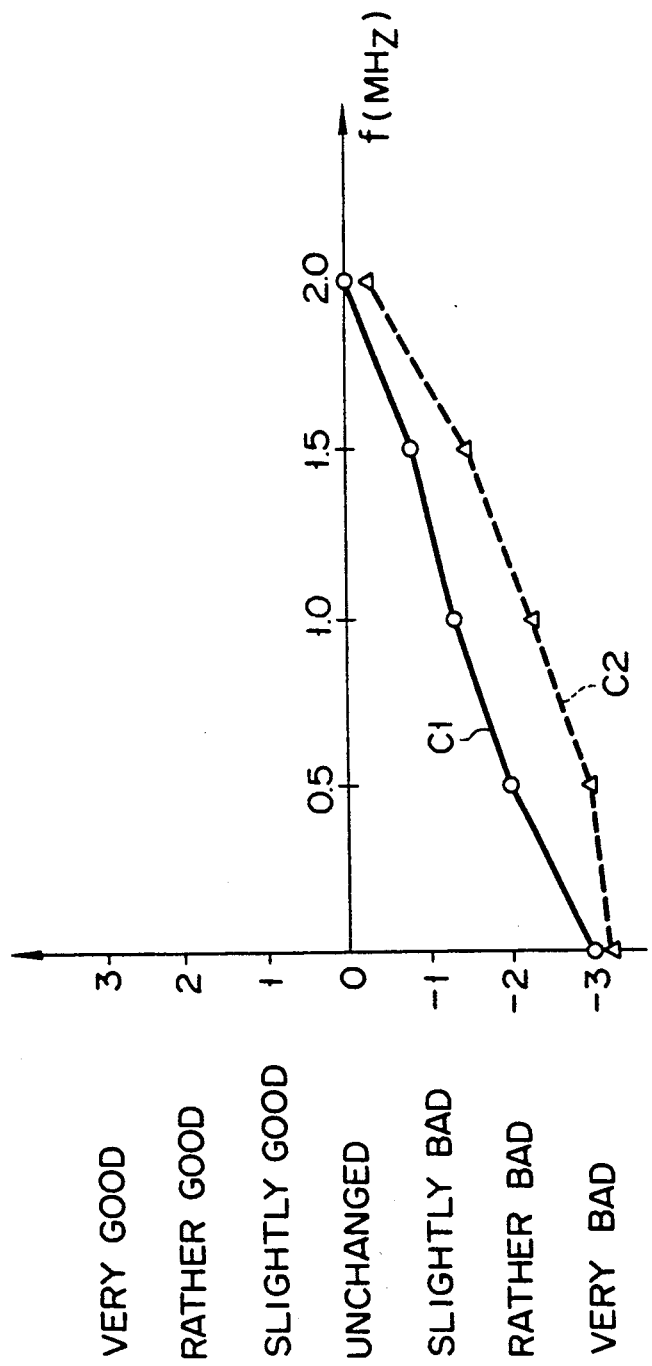
FIG. 8 is a diagram for explaining the effects of the transmitting and receiving devices of FIGS. 1 and 2.

FIG. 8 illustrates the results of the experiments to visually evaluate whether the awkward movements occur or not with the above boundary frequency f taken as a parameter. The horizontal axis represents the boundary frequency f and the vertical axis represents categories for comparative evaluation. The comparative evaluation categories have seven grades from "very bad" to "very good".

In FIG. 8, the curve C1 represents the results of evaluation of the case where the interfield averaging process is followed by the field thinning out process to band-limit the horizontal high frequency component H in the temporal direction (t) as in FIG. 1 On the other hand, the curve C2 represents the results of evaluation of the case where the band limitation is performed only by the field thinning out process. The results when no band limitation is performed agrees with the horizontal axis. Therefore, if the Y signal is separated into the horizontal high frequency component H and the horizontal low frequency component L with a frequency at a point where the curves C1 and C2 cross the horizontal axis taken as the boundary frequency f, then the horizontal low frequency component L will contain any of components necessary for smooth movements. According to the results of evaluation of FIG. 8, such a frequency is 2 MHz. Accordingly, if the boundary frequency f is set to 2 MHz as in the present embodiment, the band limitation with respect to the temporal direction (v) based on the field repeating process will prevent visually awkward movements from being produced.

Although one embodiment of the present invention has been disclosed and described in detail, the present invention is not limited to the specific embodiment.

For example, although, in the previous embodiment, the interlace conversion of the horizontal high frequency component H is effected by means of the interfield averaging process, the field thinning out process and the field delay process, the interfield averaging process may be omitted.

In addition, while, in the previous embodiment, the boundary frequency f between the horizontal high frequency component H and the horizontal low frequency component L is set to 2 MHz, it may be set to a frequency other than 2 MHz. In this case, a frequency below 2 MHz may be chosen so long as it falls within a range which may allow the visual unnaturalness of movements.

The present invention, of course, may be modified in various ways without departing the spirit and scope thereof.

As described above, the present invention can always perform the interlace conversion of the horizontal high frequency component of the Y signal by means of the interfield interpolation, thus avoiding the fluttering of horizontal reproduced edges and the degradation of the vertical resolution in moving pictures.

What is claimed is:

1. A television signal transmitting and receiving system comprising:
   first signal separating means for separating a luminance signal of a noninterlaced format into a horizontal high frequency component having frequencies not lower than a predetermined horizontal frequency and a horizontal low frequency component below the predetermined horizontal frequency;
   first interlace conversion means, including at least a field thinning out means and a field delay means, for converting the horizontal high frequency component separated by said first signal means to an interlaced signal, said field thinning out means thinning out alternative fields of the horizontal high frequency component and said delaying means delaying an output of said field thinning out means on alternate horizontal scanning lines by a time equal to one field interval to thereby distribute a signal of one field to two fields;
   second interlace conversion means for converting the horizontal low frequency component separated by said first signal separating means to an interlaced signal by a line thinning out process;
   transmitting means for combining and transmitting output signals of said first and second interlace conversion means;
   second signal separating means for receiving a transmission signal transmitted by said transmitting means and for separating the received signal into the horizontal high frequency component and the horizontal low frequency component;
   first noninterlace conversion means for converting the horizontal high frequency component separated by said second separating means to a noninterlaced signal by an interfield interpolation process;
   second noninterlace conversion means for converting the horizontal low frequency component separated by said second signal separating means to a noninterlaced signal by a motion-adaptive interpolation process; and
   combining means for combining output signals of said first and second noninterlace conversion means.

2. A television signal transmitting and receiving system according to claim 1, wherein the noninterlaced format of the luminance signal comprises: 525 lines per frame, a frame frequency of 60 Hz, and a $32\mu$ second in line period.

3. A television signal transmitting device comprising:
   a signal separating means for separating a luminance signal of a noninterlaced format into a horizontal high frequency component having frequencies not lower than a predetermined horizontal frequency and a horizontal low frequency component below the predetermined horizontal frequency;
   first interlace conversion means, including at least a field thinning out means and a field delaying means, for converting the horizontal high frequency component separated by said signal separating means to an interlaced signal, said field thinning out means thinning out alternate fields of the horizontal high frequency component and said delaying means delaying an output signal of said field thinning out means on alternate horizontal scanning lines by a time equal to one field interval to thereby distribute a signal of one field to two fields;
   second interlace conversion means for converting the horizontal low frequency component separated by said signal separating means to an interlaced signal by a line thinning out process; and
   transmitting means for combining and transmitting output signals of said first and second interlace conversion means.

4. A television signal transmitting device according to claim 3 wherein the predetermined horizontal frequency is set to such a frequency as to allow the horizontal low frequency component to contain components necessary for visual naturalness of movements of reproduced pictures.

5. A television signal transmitting device according to claim 3, further comprising third interlace conversion means for converting a color difference signal to an interlaced signal by thinning out horizontal scanning lines thereof; and wherein said transmitting means combines output signals of said first, second and third interlace conversion means for transmission.

6. A television signal transmitting device according to claim 3, wherein the first interlace conversion means further includes an interfield averaging means obtaining an interfield average value of the horizontal high frequency component, the output signal of said interfield averaging means being inputted to said field thinning out means.

7. A television signal receiving device comprising:
signal separating means for separating a luminance signal of an interlaced format into a horizontal high frequency component equal to or above a predetermined horizontal frequency and a horizontal low frequency component below the predetermined horizontal frequency, the horizontal high frequency component being converted to an interlaced signal by at least a field thinning out means thinning out alternate fields of the horizontal high frequency component and a delay means delaying an output signal of said field thinning out means on alternate horizontal scanning lines by a time equal to one field interval to thereby distribute a signal of one field to two fields, and the horizontal low frequency component being converted to an interlaced signal by means of a line thinning out process;
first noninterlace conversion means for converting the horizontal high frequency component separated by said signal separating means to a noninterlaced signal by means of an interfield interpolation process;
second noninterlace conversion means for converting the horizontal low frequency component separated by said signal separating means to a noninterlaced signal by means of a motion-adaptive interpolation process; and combining means for combining output signals of said first and second noninterlace conversion means.

8. A television signal receiving device according to claim 7, wherein the predetermined horizontal frequency is set to such a frequency as to allow the horizontal low frequency component to contain components necessary for visual naturalness of movements of reproduced pictures.

9. A television signal receiving device according to claim 7, wherein said first noninterlace conversion means comprises interfield addition means for adding tow successive fields of the horizontal high frequency component output from said signal separating means; and field repeating means for outputting an output signal of said interfield addition means in field sequence to thereby convert the horizontal high frequency component to a noninterlaced signal.

10. A television signal receiving device according to claim 7, further comprising third noninterlace conversion means for converting a color difference signal which is converted to an interlaced signal by a line thinning out process to a noninterlaced signal by a motion-adaptive interpolation process.

11. A television signal receiving device according to claim 7, wherein the first interlace conversion means further includes an interfield averaging means for obtaining an interfield average value of the horizontal high frequency component, the output signal of said interfield averaging means being inputted to said field thinning out means.

* * * * *